(12) United States Patent
Hashim

(10) Patent No.: US 10,127,505 B1
(45) Date of Patent: Nov. 13, 2018

(54) COMPUTER METHODS AND SYSTEMS FOR BUILDING AND MAINTAINING SUBSCRIBER RECRUITMENT, RETENTION AND LOYALTY IN A SUBSCRIPTION SERVICE MODEL

(71) Applicant: Aaron Hashim, Bakersfield, CA (US)

(72) Inventor: Aaron Hashim, Bakersfield, CA (US)

(73) Assignee: Hashim Investments, Inc., Keller, TX (US)

( * ) Notice: Subject to any disclaimer, the term of this patent is extended or adjusted under 35 U.S.C. 154(b) by 295 days.

(21) Appl. No.: 15/216,290

(22) Filed: Jul. 21, 2016

Related U.S. Application Data

(63) Continuation of application No. 14/056,730, filed on Oct. 17, 2013, now abandoned, which is a continuation of application No. 13/182,936, filed on Jul. 14, 2011, now abandoned.

(51) Int. Cl.
| | |
|---|---|
| *G06Q 10/06* | (2012.01) |
| *G06F 9/451* | (2018.01) |
| *H04L 29/06* | (2006.01) |
| *G06F 17/30* | (2006.01) |
| *G06F 17/27* | (2006.01) |
| *G06F 3/0484* | (2013.01) |

(52) U.S. Cl.
CPC ....... *G06Q 10/0631* (2013.01); *G06F 3/0484* (2013.01); *G06F 9/451* (2018.02); *G06F 17/2705* (2013.01); *G06F 17/2785* (2013.01); *G06F 17/30864* (2013.01); *H04L 67/42* (2013.01)

(58) Field of Classification Search
CPC ... G06Q 10/0631; G06F 9/451; G06F 3/0484; G06F 17/2705; G06F 17/30864; G06F 17/2785; H04L 67/42

USPC .......................................................... 705/1.1
See application file for complete search history.

(56) References Cited

U.S. PATENT DOCUMENTS

| | | | |
|---|---|---|---|
| 7,054,833 B1* | 5/2006 | McDonald | G06Q 30/06 705/26.1 |
| 2010/0042520 A1* | 2/2010 | Rose | G06O 20/108 705/30 |
| 2010/0281020 A1* | 11/2010 | Drubner | G06Q 30/08 707/722 |

OTHER PUBLICATIONS

National Association of Unclaimed Property Administrators, [online], May 25, 2010 [retrieved on Jul. 6, 2018]. Retrieved from the Internet: https://web.archive.org/web/20100525100048/http://www.missingmoney.com:80/GeneralHelp/FAQ.cfm, pp. 1-3 (Year: 2010).*

* cited by examiner

*Primary Examiner* — Lynda Jasmin
*Assistant Examiner* — Ehrin L Pratt
(74) *Attorney, Agent, or Firm* — Greenberg Traurig, LLP

(57) ABSTRACT

In one embodiment, the instant invention includes a computer system, having at least one processor for executing the computer executable program code stored in memory, where the program code includes: code to provide a benefit to subscribers of a subscription entity, where the benefit includes uncovered information about unclaimed asset, available asset, claim, and/or entitlement for subscribers and where the uncovered information is obtained by employing: code to store, in a subscriber database, records containing personal data of subscribers; code to search a repository database based on a portion of subscribers' personal data to uncover for at least one subscriber at least one of: i) unclaimed asset, ii) available asset, iii) claim, and iv) entitlement; code to receive the uncovered information for subscribers; and code to alert subscribers to the uncovered information.

14 Claims, 6 Drawing Sheets

COMPUTER METHODS AND SYSTEMS FOR BUILDING AND MAINTAINING SUBSCRIBER RECRUITMENT, RETENTION AND LOYALTY IN A SUBSCRIPTION SERVICE MODEL

RELATED APPLICATIONS

This application is a continuation of U.S. application Ser. No. 14/056,730, entitled "COMPUTER METHODS AND SYSTEMS FOR BUILDING AND MAINTAINING SUBSCRIBER RECRUITMENT, RETENTION AND LOYALTY IN A SUBSCRIPTION SERVICE MODEL", filed on Oct. 17, 2013, which is a continuation of U.S. application Ser. No. 13/182,936, entitled "COMPUTER METHODS AND SYSTEMS FOR BUILDING AND MAINTAINING SUBSCRIBER RECRUITMENT, RETENTION AND LOYALTY IN A SUBSCRIPTION SERVICE MODEL," filed on Jul. 14, 2011, which is incorporated herein by reference in its entirety for all purposes.

TECHNICAL FIELD

The present invention relates to computer methods and systems for building and maintaining subscriber recruitment, retention and loyalty in a subscription service model.

BACKGROUND

Typically, in the subscription service model, companies look into incentivizing its potential and current subscribers to build and maintain subscriber recruitment, retention and loyalty.

SUMMARY OF INVENTION

In some embodiments, the instant invention provides benefit(s) to subscribers of a subscription entity by informing them of unclaimed or available assets, claims and/or entitlements as part of a subscription in order to build and maintain subscription recruitment, retention and loyalty.

In some embodiments, the instant invention includes a computer-implemented method having steps of: providing, by at least one first programmed computer, at least one benefit to at least one subscriber of at least one subscription entity, where the at least one benefit includes uncovered information about at least one of unclaimed asset, available asset, claim, and entitlement for the at least one subscriber and where the uncovered information is obtained, at least in part, by: storing, by at least one second programmed computer, in at least one subscriber database, at least one record containing personal data of the at least one subscriber; searching, by at least third programmed computer, at least one repository database, based, at least in part, on at least a portion of the stored personal data of the at least one subscriber, to uncover for the at least one subscriber at least one of: i) unclaimed asset, ii) available asset, iii) claim, and iv) entitlement; where the at least one repository database contains information about at least one of unclaimed asset, available asset, claim, and entitlement for a plurality of person; receiving, by at least fourth programmed computer, the uncovered information for the at least one subscriber; and alerting the at least one subscriber to the uncovered information.

In some embodiments, the instant invention further includes parsing, by at least one fifth programmed computer, the information about at least one of unclaimed asset, available asset, claim, and entitlement for the plurality of person from the at least one repository database to match the parsed information to the at least a portion of the stored personal data of the at least one subscriber.

In some embodiments, the at least portion of the stored personal data of the at least one subscriber includes at least the name of the at least one subscriber and at least one address where the at least one subscriber lives or has lived.

In some embodiments, subscriber retention of the at least one subscription entity is based, at least in part, on the at least one provided benefit.

In some embodiments, subscriber enrollment of the at least one subscription entity is based, at least in part, on the at least one provided benefit.

In some embodiments, the step of searching, by the at least third programmed computer, is performed by a third party.

In some embodiments, at least two computers of the at least one first through fourth computers are the same. In some embodiments, at least two computers of the at least one first through fourth computers are different. In some embodiments, at least two computers of the at least one first through fifth computers are the same. In some embodiments, at least two computers of the at least one first through fifth computers are different.

In some embodiments, the instant invention includes a computer system, having at least the following components: a) memory having at least one region for storing computer executable program code; and b) at least one processor for executing the computer executable program code stored in the memory, where the computer executable program code includes: code to provide at least one benefit to at least one subscriber of at least one subscription entity, where the at least one benefit includes uncovered information about at least one of unclaimed asset, available asset, claim, and entitlement for the at least one subscriber and where the uncovered information is obtained, at least in part, by employing: code to store, in at least one subscriber database, at least one record containing personal data of the at least one subscriber; code to search at least one repository database based, at least in part, on at least a portion of the stored personal data of the at least one subscriber, to uncover for the at least one subscriber at least one of: i) unclaimed asset, ii) available asset, iii) claim, and iv) entitlement; where the at least one repository database includes information about at least one of unclaimed asset, available asset, claim, and entitlement for a plurality of person; code to receive the uncovered information for the at least one subscriber; and code to alert the at least one subscriber to the uncovered information.

In some embodiments, the at least one processor of the system of the instant invention further execute code to parse the information about at least one of unclaimed asset, available asset, claim, and entitlement for the plurality of person from the at least one repository database to match the parsed information to the at least a portion of the stored personal data of the at least one subscriber.

Figure 1:
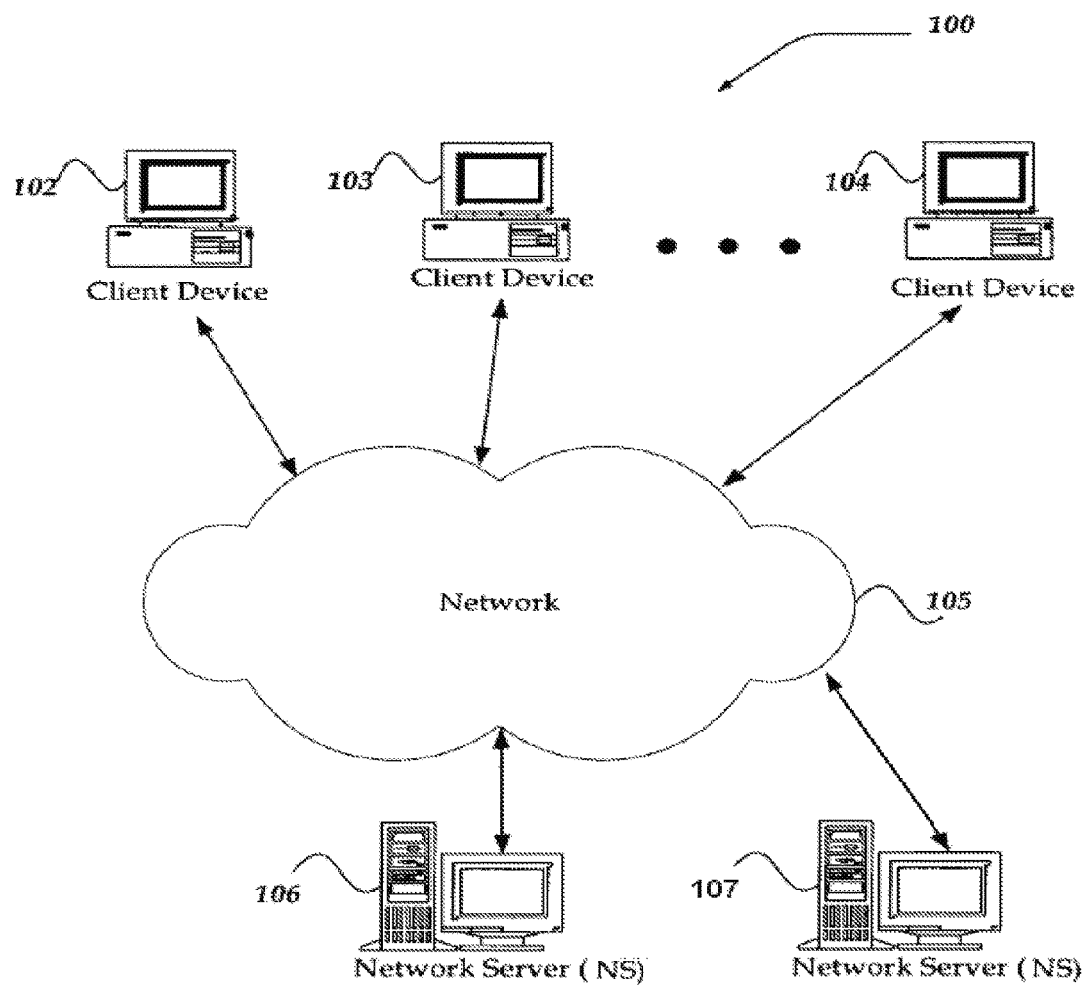
FIG. 1 illustrates an embodiment of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Subscription entity. An entity that provides at least one offering to a recipient (e.g., another entity or a person) that has agreed (contractually and/or otherwise) to receive and/or use the at least one offering during a period of time. In one specific example, the subscription entity periodically provide the at least one offering to the recipient.

Subscriber. An entity or a person who has agreed (contractually and/or otherwise) to receive and/or use at least one offering of a subscription entity during a period of time. In one specific example, subscriber's receipt and/or use of at least one offering from a subscription entity during a period of time is based at least in part on a monetary compensation paid by either the subscriber to the subscription entity or by the subscription entity to the subscriber. In another specific example, subscriber's receipt and/or use of at least one offering from a subscription entity during a period of time is based at least in part on a non-monetary compensation provided by either the subscriber to the subscription entity or by the subscription entity to the subscriber. In yet another specific example, subscriber's receipt and/or use of at least one offering from a subscription entity during a period of time is not based at least in part on either monetary or non-monetary compensation provided by either the subscriber to the subscription entity or by the subscription entity to the subscriber.

Subscription. At least one offering which is provided by a subscription entity to a subscriber who has agreed (contractually and/or otherwise) to receive and/or use such offering during a period of time. In one specific example, the subscription is at least one offering which is periodically provided by a subscription entity to a subscriber who has agreed (contractually and/or otherwise) to receive and/or use such offering during a period of time.

Benefit. A service and/or product that either is a part of a subscription or an additional service and/or product which is, complementary or non-complementary, provided by a subscription entity to a subscriber.

In some embodiments, the instant invention provides benefit(s) to subscribers of identity monitoring agencies through building and maintaining subscriber recruitment, retention and loyalty by informing subscribers of unclaimed or available assets, claims and/or entitlements. In some embodiments, claims mean any and all claims, demands, actions, causes of action, and all other claims of every kind and nature in law or equity, whether arising under state, federal, international, administrative and/or other law.

In some embodiments, examples of unclaimed or available assets, claims and/or entitlements can be unclaimed or lost money (e.g., Federal, State, County, City and private pre escheat money) that is linked to individuals and available to be claimed by them.

In some embodiments, examples of unclaimed or available assets, claims and/or entitlements can be homeowner or personal exemptions such as (a) various exemptions that depend on where a home is located and if it is person's primary residence; and/or (b) exemptions based on personal characteristics such as a particular town may have reduce fees for residents who are over the age of 65 (e.g., senior residents of Bakersfield, Calif., are entitled to receive a half of annual trash fee back valued at $90.)

In some embodiments, examples of unclaimed or available assets, claims and/or entitlements can be class action member letters, unused gift cards, etc.

In some embodiments, the instant invention produces a subscriber retention in a range of about 10-25% of subscribers who would otherwise leave. In some embodiments, the instant invention produces a subscriber retention in a range of about 5-25% of subscribers who would otherwise leave. In some embodiments, the instant invention produces a subscriber retention in a range of about 5-10% of subscribers who would otherwise leave. In some embodiments, the instant invention produces a subscriber retention in a range of about 5-15% of subscribers who would otherwise leave. In some embodiments, the instant invention produces a subscriber retention in a range of about 10-30% of subscribers who would otherwise leave. In some embodiments, the instant invention produces a subscriber retention in a range of about 5-50% of subscribers who would otherwise leave. In some embodiments, the instant invention produces a subscriber retention in a range of about 5-75% of subscribers who would otherwise leave. In some embodiments, the instant invention produces a subscriber retention in a range of about 25-75% of subscribers who would otherwise leave. In some embodiments, the instant invention produces a subscriber retention in a range of about 25-50% of subscribers who would otherwise leave. In some embodiments, the instant invention produces a subscriber retention in a range of about 50-75% of subscribers who would otherwise leave.

In some embodiments of the instant invention, information regarding any discovered unclaimed or available assets, claims and/or entitlements is a benefit of subscribing to an offering provided by a subscription entity. In one specific example, the subscription to the provided offering is totally unrelated to unclaimed or available assets, claims and/or entitlements of subscribers (e.g., credit monitoring or identity monitoring). In another specific example, the subscription to the provided offering is related to unclaimed or available assets, claims and/or entitlements of subscribers.

In some embodiments of the instant invention, if subscribers decide to claim any discovered unclaimed or available assets, claims and/or entitlements, subscribers can then be charged based on the value of discovered unclaimed or available assets, claims and/or entitlements. In some embodiments of the instant invention, if subscribers decide to claim any discovered unclaimed or available assets, claims and/or entitlements, subscribers can then be charged based on the recovered value of discovered unclaimed or available assets, claims and/or entitlements. In some embodiments of the instant invention, if subscribers decide to claim any discovered unclaimed or available assets, claims and/or entitlements, subscribers can then be charged based on criteria which are not tied to value of discovered unclaimed or available assets, claims and/or entitlements (e.g., a flat fee per processed claim).

In some embodiments of the instant invention, if the searching for and/or claiming of unclaimed or available assets, claims and/or entitlements is performed by a computer system of a third party and not by a entity who offers the subscription service, the third party may charge the subscription entity. In some embodiments, the third party's fees are assessed from the subscription entity per notification provided to subscriber(s) of the subscription entity (e.g., a flat fee per hit of discovered information).

In some embodiments, the third party's fees are assessed from the subscription entity based on a percent of new subscribers of the subscription entity for whom information of unclaimed or available assets, claims and/or entitlements have been found. In some embodiments, the third party's fees are assessed from the subscription entity based on assumption that the third party's computer searching discovers unclaimed or available assets, claims and/or entitlements for about 5 to about 13 percent of new subscribers of the subscription entity. In some embodiments, the third party's fees are assessed from the subscription entity based on assumption that the third party's computer searching discovers unclaimed or available assets, claims and/or entitlements for about 5 to about 25 percent of new subscribers of the subscription entity. In some embodiments, the third party's fees are assessed from the subscription entity based on assumption that the third party's computer searching discovers unclaimed or available assets, claims and/or entitlements for about 15 to about 25 percent of new subscribers of the subscription entity. In some embodiments, the third party's fees are assessed from the subscription entity based on assumption that the third party's computer searching discovers unclaimed or available assets, claims and/or entitlements for about 20 to about 50 percent of new subscribers of the subscription entity.

In some embodiments, the third party's fees are assessed from the subscription entity based on a flat fee per each new subscriber of the subscription entity. In some embodiments, the third party's fees are assessed from the subscription entity based on fees that depend on a number of new and/or retained subscribers of the subscription entity. In some embodiments, the third party's fees are assessed from the subscription entity based on fees that depend on a number of months that new and/or existing subscribers of the subscription entity maintain the subscription longer than subscribers to whom benefit(s) of informing and/or claiming unclaimed or available assets, claims and/or entitlements have not been provided. In some embodiments, the third party's fees are assessed from the subscription entity based on a combination of two or more of the following: a flat fee per each new subscriber; a percent of new subscribers for whom information of unclaimed or available assets, claims and/or entitlements have been found; a number of new and/or retained subscribers of the subscription entity; and a number of months that new and/or existing subscribers of the subscription entity maintain the subscription longer than subscribers to whom benefit(s) of informing and/or claiming unclaimed or available assets, claims and/or entitlements have not been provided.

In some embodiments, in the case of a credit rating agency, the instant invention can cross references information in a credit file of its subscriber with outside information related to unclaimed or available assets, claims and/or entitlements and obtained through a variety of sources (public records, private records, demographic information etc.)

In some embodiments, the instant invention allows a subscriber to customize information that he or she wants to receive about unclaimed or available assets, claims and/or entitlements.

In some embodiments, the instant invention can provide an indicator on a webpage that alerts subscribers/subscribers to information related to discovered unclaimed or available assets, claims and/or entitlements.

Examples of Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiment, the system of the instant invention hosts a large number of members and concurrent transactions. In other embodiments, the system of the instant invention is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. traders etc.) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
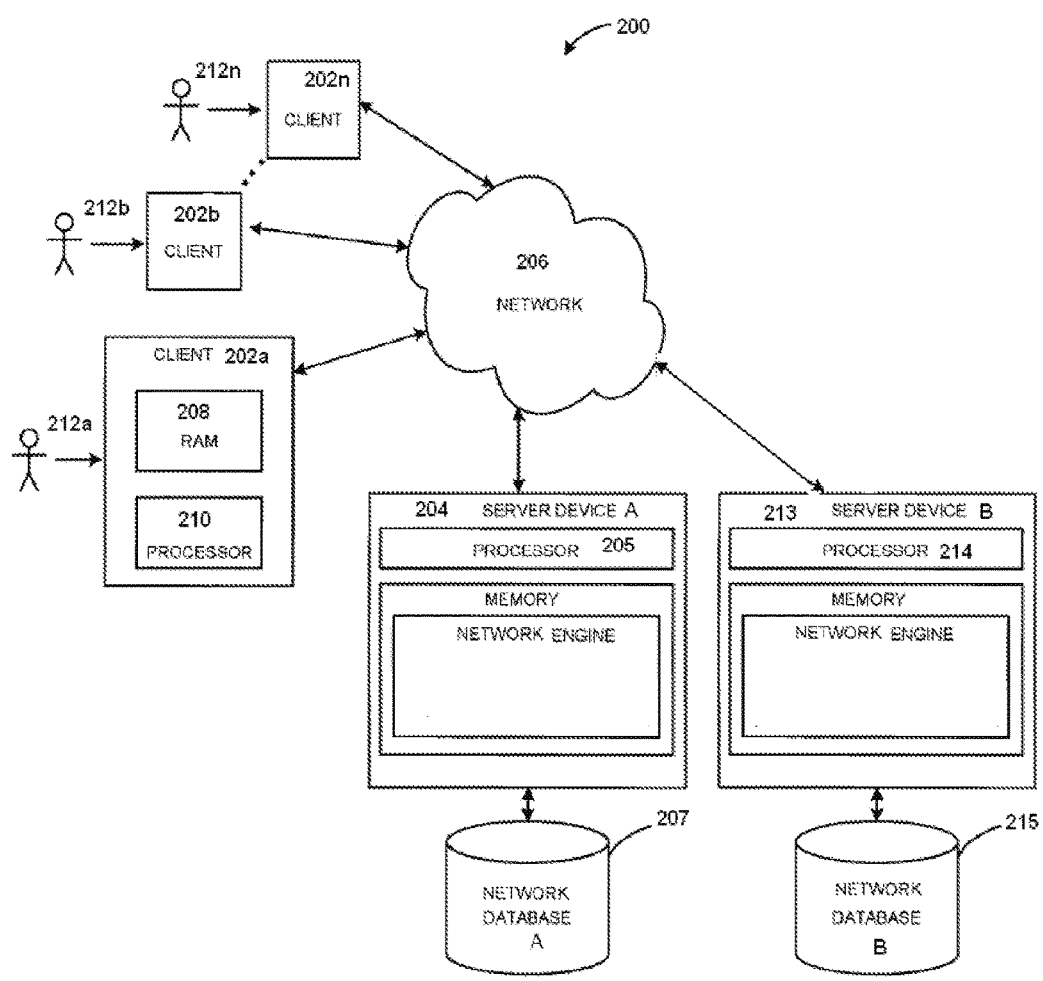
FIG. 2 illustrates another embodiment of the present invention.

FIG. 2 shows another exemplary embodiment of the computer and network architecture that supports the present invention. The member devices 202*a*, 202*b* thru 202*n* shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202*a*, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202*a-n* may also comprise a number of external or internal devices such as a mouse, a CD-ROM, DVD, a keyboard, a display, or other input or output devices. Examples of client devices 202*a-n* may be personal computers, digital assistants, personal digital assistants, cellular phones, mobile phones, smart phones, pagers, digital tablets, laptop computers, Internet appliances, and other processor-based devices. In general, a client device 202*a* are be any type of processor-based platform that is connected to a network 206 and that interacts with one or more application programs. Client devices 202*a-n* may operate on any operating system capable of supporting a browser or browser-enabled application, such as Microsoft™, Windows™, or Linux. The client devices 202*a-n* shown may include, for example, personal computers executing a browser application program such as Microsoft Corporation's Internet Explorer™, Apple Computer, Inc.'s Safari™, Mozilla Firefox, and Opera.

Through the client devices 202*a-n*, users (e.g. traders, etc.) 212*a-n* communicate over the network 206 with each other and with other systems and devices coupled to the network 206. As shown in FIG. 2, server devices 204 and 213 may be also coupled to the network 206.

Examples of Various Implementations

Figure 3:
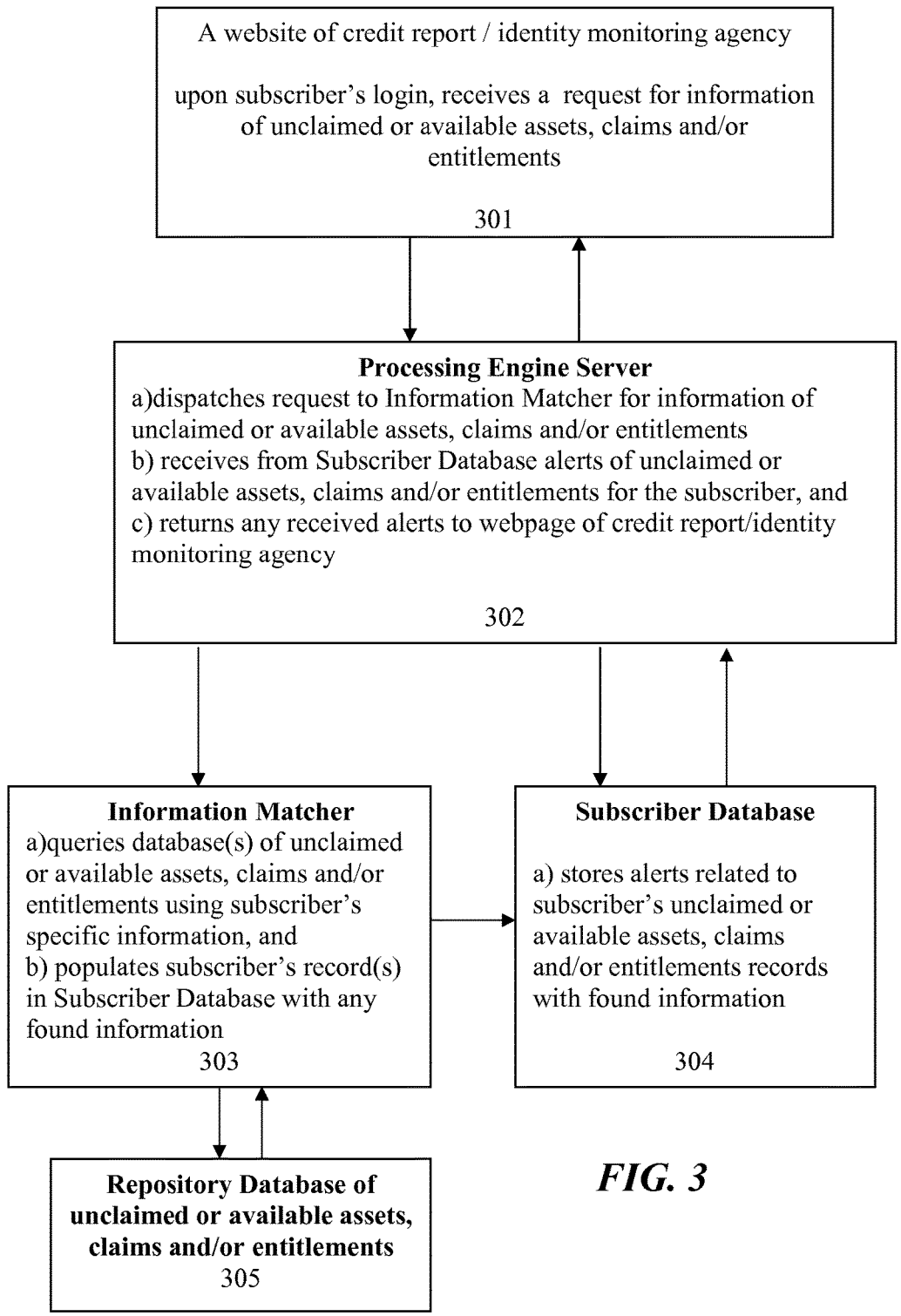
FIG. 3 illustrates yet another embodiment of the present invention.

In some embodiments, as illustrated by a flowchart of FIG. 3, the instant invention is implemented as follows. As illustrated by block 301, when a subscriber of, for instance, credit report or identity monitoring agency (an subscription entity) logs into a website of the agency, the subscriber can be presented with an indicator, a web page, or other similar visual representation that allows the subscriber to be informed about any of his or hers unclaimed or available assets, claims and/or entitlements. Table 1 provides an exemplary list of US-based credit report or identity monitoring agencies who can generate revenue by building and maintaining subscriber recruitment, retention and loyalty by employing the instance invention.

TABLE 1

Identity Monitoring Agencies As Subscription Entities

| | | | |
|---|---|---|---|
| 1 | CSIdentity | 14 | Kroll |
| 2 | One Technologies | 15 | Intellius |
| 3 | Affinion | 16 | Trusted ID |
| 4 | Intersections | 17 | Debix |
| 5 | LifeLock | 18 | Info Armor |
| 6 | Experian | 19 | Encore Marketing |
| 7 | Transunion | 20 | Identity IQ |
| 8 | Equafax | 21 | ID Analytics |
| 9 | National Credit Report | 22 | Modern Ad Media |
| 10 | Mighty Net (credit report.com) | 23 | Manage My Score |
| 11 | Adaptive Marketing | 24 | Equadata |
| 12 | Consumer Direct | 25 | Merchants Information |
| 13 | Assurant | 16 | Pre-Paid Legal |

In some embodiments, upon login, the subscriber is directed to the agency's general webpage that contains a jump link or tab, or other similar functionality (e.g., indicator) block 301) which provides information about uncovering subscriber's unclaimed or available assets, claims and/or entitlements. In some embodiments, upon login, the subscriber is directed to the agency's general webpage that contains a jump link or tab, or other similar functionality (e.g., indicator) which, upon activation, directs the subscriber to a specific portion of the agency's website that is related to functionality for uncovering subscriber's unclaimed or available assets, claims and/or entitlements.

In some embodiments, the page with functionality for uncovering subscriber's unclaimed or available assets, claims and/or entitlements (block 301) is a result of programmed instructions that allows the agency's computer(s) (e.g., a programmed Processing Engine server, 302) to receive information and request from, for example, a subscriber and to query for information that is related to subscriber's potential unclaimed or available assets, claims and/or entitlements. In some embodiments, the programmed instructions can query for information that is related to subscriber's potential unclaimed or available assets, claims and/or entitlements without the subscriber's direct request and perform its functionality based on some predetermined programmed trigger condition(s) that results in a alert to the subscriber about his or her potential unclaimed or available assets, claims and/or entitlements.

In some embodiments, the programmed instructions of the Processing Engine server (block 302) queries one or more databases (e.g., "Subscriber" database, block 304) for any information about that the agency may have already gathered about subscriber's potential unclaimed or available assets claims and/or entitlements.

In some embodiments, the programmed instructions of the Processing Engine server (block 302) can query an intermediary subroutine and/or computer (e.g., "Information Matcher," block 303) for additional/updated information of unclaimed or available assets, claims and/or entitlements based on subscriber's personal information (e.g., past address history, etc). In its turn, the "Information Matcher" subroutine and/or computer queries one or more electronic source/repository database (block 305) for any new and/or updated information about unclaimed or available assets, claims and/or entitlements. In some embodiments, if any new or updated information is available, the "Information Matcher" subroutine and/or computer updates or creates record(s) in, for example, the Subscriber database (block 304) and/or returns the newly discovered information to the Processing Engine server (block 302).

In some embodiments, the "Information Matcher" subroutine and/or computer performs its searching based on, for example, the following "address history" matching algorithm:

1) For example, if subscriber's personal information includes "William Smith at 123 First ave." and the "Information Matcher" (block 303) finds "Willie Smith" at the same address, the "Information Matcher" (block 303) would treat it as a hit and would create/update corresponding record(s) in the Subscriber database (block 304) and/or alert the Processing Engine server (block 302).

2) For example, if subscriber's personal information includes "Willie Johnson 123 First Avenue" and the "Information Matcher" (block 303) finds "Willie Johnson 123 First Ave." (e.g., the same address but transcribed differently) or "Willie Johnson 12 First Avenue" (e.g., certain allowed error deviation), the "Information Matcher" (block 303) would treat it as a hit and would create/update corresponding record(s) in the Subscriber database (block 304) and/or alert the Processing Engine server (block 302).

In some embodiments, the instant invention automatically fix and check variations to catch the close case errors/variations. In some embodiments, the instant invention automatically fix and check variations to catch the close case errors/variations based on one or more suitable phonetic and/or semantic language techniques to identify close variations based on predetermined requirements/conditions (e.g., variations one character, variations in 1-3 characters, variations in 1-10 characters, variation in 1-5 words, variations in abbreviations, etc.)

In some embodiments, the programmed instructions of the Processing Engine server then alert to and/or provide new and/or updated information to the subscriber through, for example, the Processing Engine page.

In some embodiments, the "Information Matcher" (block 303) is a component of the Processing Engine server (block 302).

In some embodiments, subscribers' personal information in the Subscriber database (block 304) does not contain information about unclaimed or available assets, claims and/or entitlements about unclaimed or available assets, claims and/or entitlements of subscribers. In some embodiments, the repository database(s) (block 305) with information about unclaimed or available assets, claims and/or entitlements resides together or within the same database as the Subscriber database (block 304).

Figure 4:
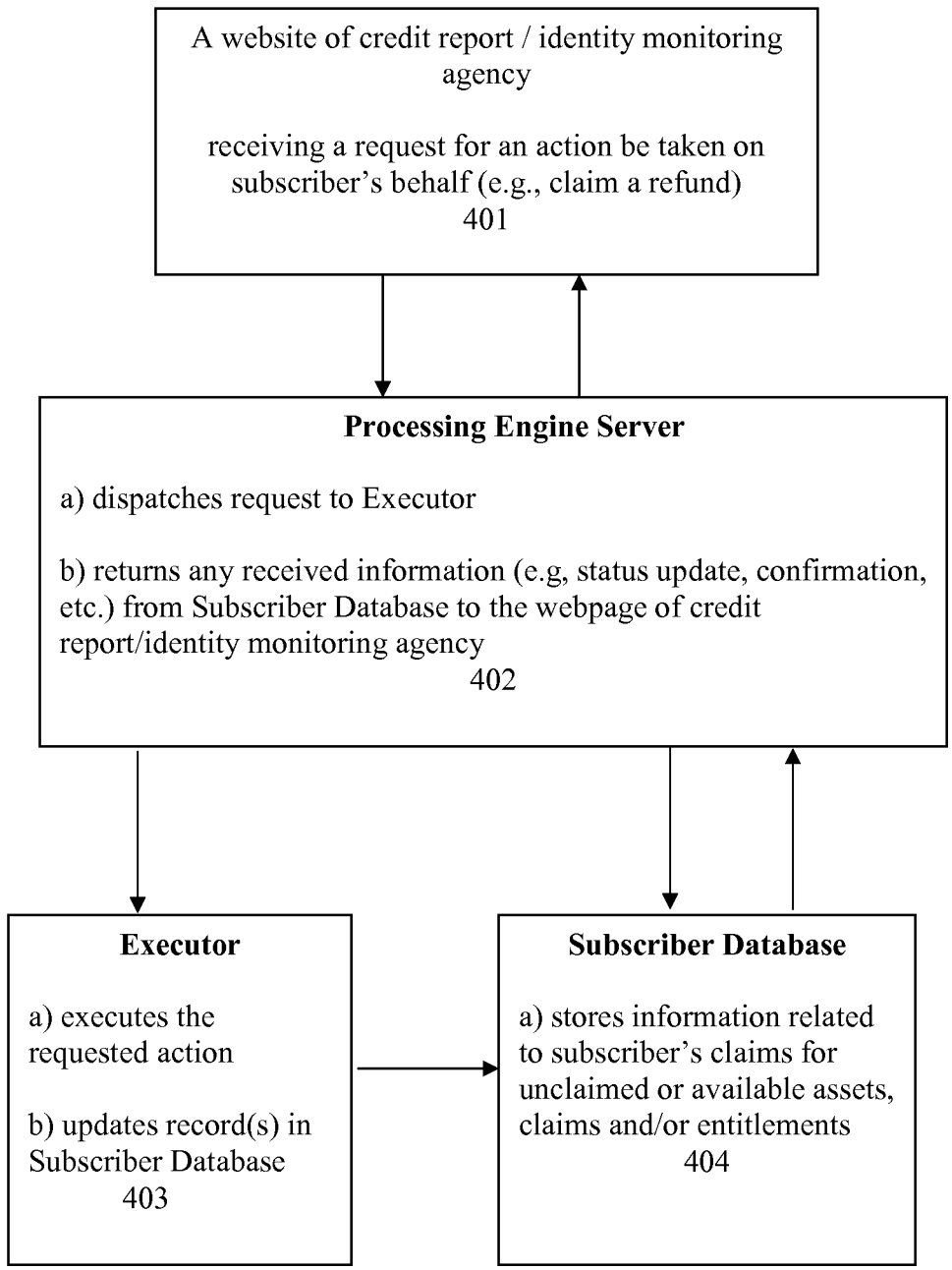
FIG. 4 illustrates yet another embodiment of the present invention.

In some embodiments, as illustrated by a flowchart of FIG. 4, the instant invention is implemented as follows. As illustrated by block 401, a subscriber of, for instance, credit report or identity monitoring agency (a subscription entity) can request the agency to take an action with respect to any identified unclaimed or available assets, claims and/or entitlements (e.g., sending an inquiry to an institution that controls subscriber's unclaimed asset and/or claiming the unclaimed asset(s), apply for entitlement(s), etc.). In some embodiments, upon receiving such recovery request, the Processing Engine server (block 402), by programmed instructions, performs actions that the subscriber has requested. In some embodiments, upon receiving such recovery request, the Processing Engine server (block 402), by programmed instructions, instructs an intermediary subroutine and/or computer (e.g., "Executor," block 403) to performs actions that the subscriber has requested with respect to the subscriber's identified unclaimed or available assets, claims and/or entitlements. In some embodiments, the Processing Engine server (block 402) and/or the "Executor" (block 403) can store any information about their activities related to subscriber's identified unclaimed or available assets, claims and/or entitlements in one or more databases (e.g., "Subscriber" database, block 404).

In some embodiments, the "Executor" (block 403) is a component of the Processing Engine server (block 402).

Figure 5:
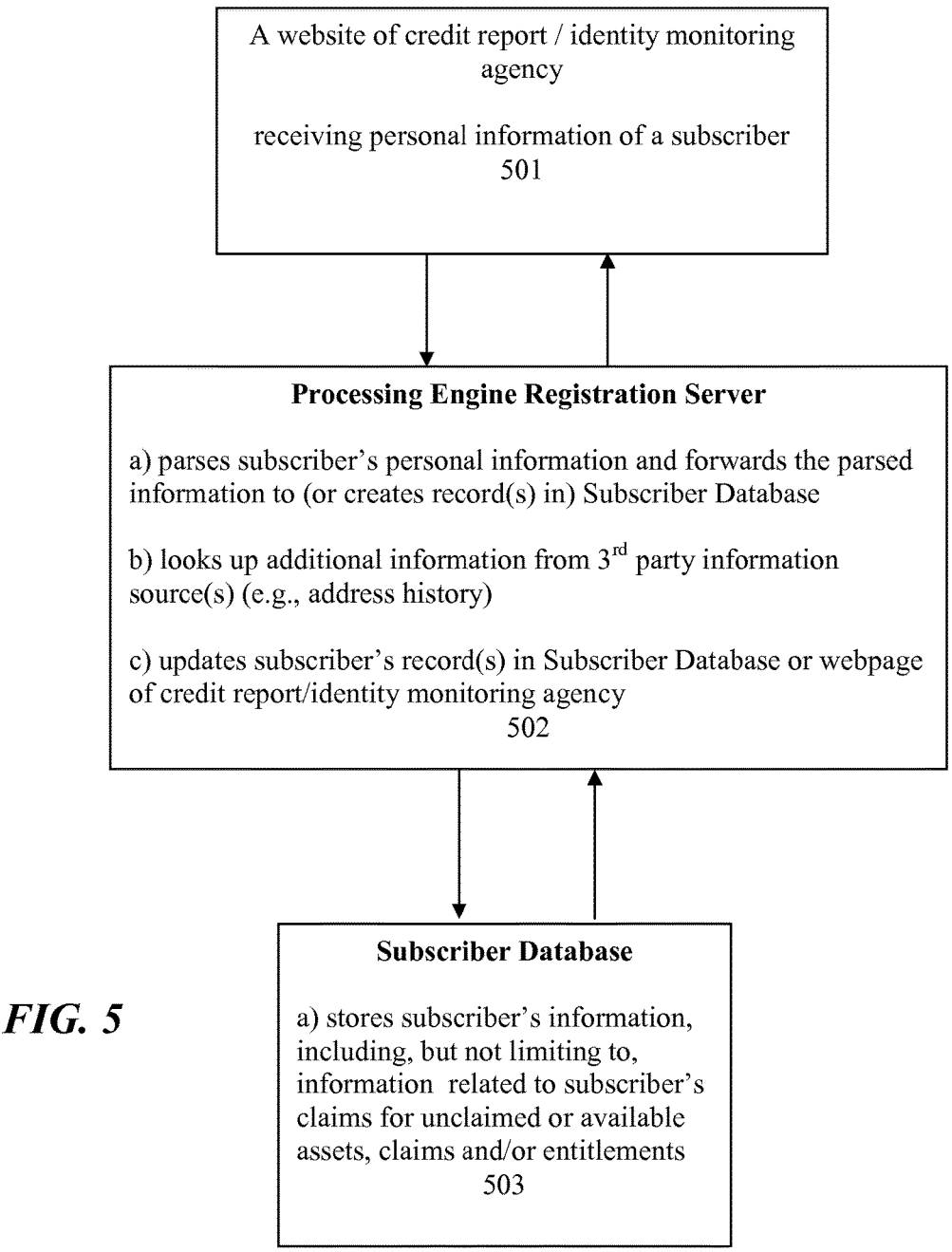
FIG. 5 illustrates yet another embodiment of the present invention.

In some embodiments, as illustrated by a flowchart of FIG. 5, the instant invention is implemented as follows. As illustrated by block 501, a subscriber of, for instance, credit report or identity monitoring agency can provide his or her personal information to the agency or the agency can gather subscriber's personal information from one or more own electronic source and/or from one of more third party electronic sources. In some embodiments, upon receiving such personal information of the subscriber, the Processing Engine server (block 502), by programmed instructions, parses subscriber's personal information and forwards the parsed information to (and/or creates record(s) in) Subscriber Database (block 503). In some embodiments, upon receiving such personal information of the subscriber, the Processing Engine server (block 502), by programmed instructions, can look up additional information from 3rd party information source(s) (e.g., address history). In some embodiments, upon receiving such personal information of the subscriber, the Processing Engine server (block 502), by programmed instructions, can update subscriber's record(s) in one or more databases (e.g., "Subscriber" Database, block 503).

Figure 6:
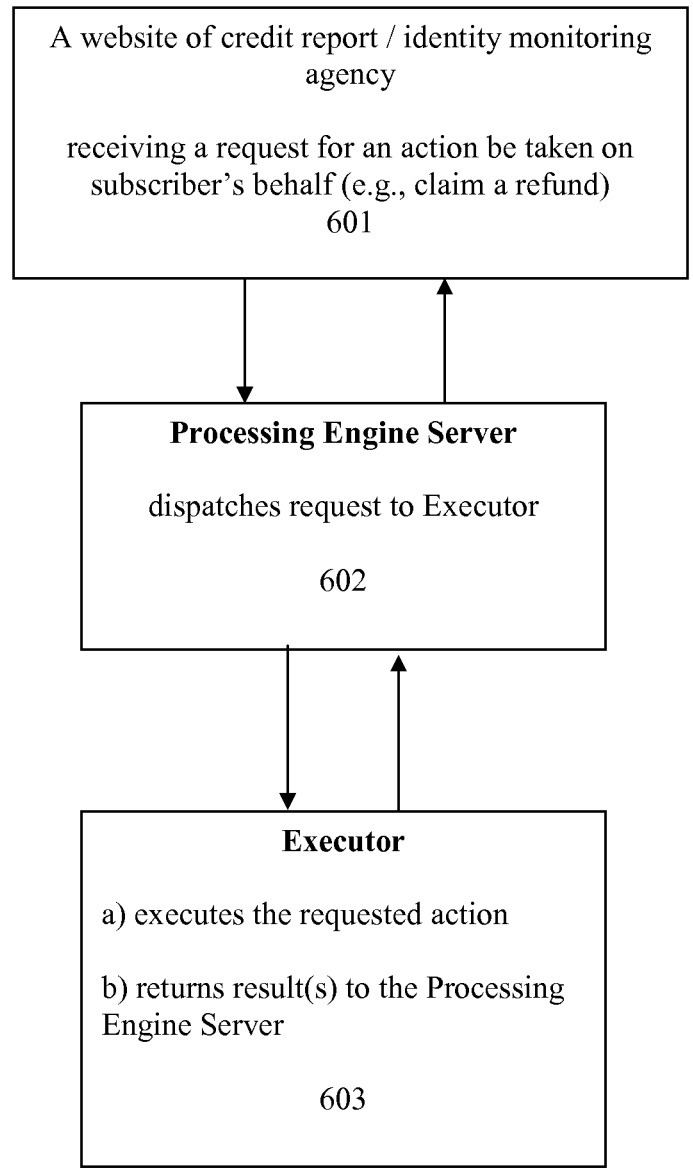
FIG. 6 illustrates yet another embodiment of the present invention.

In some embodiments, as illustrated by a flowchart of FIG. 6, the instant invention is implemented as follows. As illustrated by block 601, a subscriber of, for instance, credit report or identity monitoring agency (a subscription entity) can request the agency to take an action with respect to any identified unclaimed or available assets, claims and/or entitlements (e.g., sending an inquiry to an institution that controls subscriber's unclaimed asset and/or claiming the unclaimed asset(s), apply for entitlement(s), etc.). In some embodiments, upon receiving such recovery request, the Processing Engine server (block 602), by programmed instructions, performs actions that the subscriber has requested. In some embodiments, upon receiving such recovery request, the Processing Engine server, by programmed instructions, instructs an intermediary subroutine and/or computer (e.g., "Executor," block 603) to performs actions that the subscriber has requested with respect to the subscriber's identified unclaimed or available assets, claims and/or entitlements. In some embodiments, the "Executor" (block 603) performs actions that the subscriber has requested and returns results (e.g., a confirmation of a submitted claim, a confirmation of delivery, an acknowledgement of entitlement, etc.) to the Processing Engine server (block 602). In some embodiments, the "Executor" (block 603) is a component of the Processing Engine server (block 602).

In some embodiments, the instant invention includes a computer-implemented method having steps of: providing, by at least one first programmed computer, at least one benefit to at least one subscriber of at least one subscription entity, where the at least one benefit includes uncovered information about at least one of unclaimed asset, available asset, claim, and entitlement for the at least one subscriber and where the uncovered information is obtained, at least in part, by: storing, by at least one second programmed computer, in at least one subscriber database, at least one record containing personal data of the at least one subscriber; searching, by at least third programmed computer, at least one repository database, based, at least in part, on at least a portion of the stored personal data of the at least one subscriber, to uncover for the at least one subscriber at least one of: i) unclaimed asset, ii) available asset, iii) claim, and iv) entitlement; where the at least one repository database contains information about at least one of unclaimed asset, available asset, claim, and entitlement for a plurality of person; receiving, by at least fourth programmed computer, the uncovered information for the at least one subscriber; and alerting the at least one subscriber to the uncovered information.

In some embodiments, the instant invention further includes parsing, by at least one fifth programmed computer, the information about at least one of unclaimed asset, available asset, claim, and entitlement for the plurality of person from the at least one repository database to match the parsed information to the at least a portion of the stored personal data of the at least one subscriber.

In some embodiments, the at least portion of the stored personal data of the at least one subscriber includes at least the name of the at least one subscriber and at least one address where the at least one subscriber lives or has lived.

In some embodiments, subscriber retention of the at least one subscription entity is based, at least in part, on the at least one provided benefit.

In some embodiments, subscriber enrollment of the at least one subscription entity is based, at least in part, on the at least one provided benefit.

In some embodiments, the step of searching, by the at least third programmed computer, is performed by a third party.

In some embodiments, at least two computers of the at least one first through fourth computers are the same. In some embodiments, at least two computers of the at least one first through fourth computers are different. In some embodiments, at least two computers of the at least one first through fifth computers are the same. In some embodiments, at least two computers of the at least one first through fifth computers are different.

In some embodiments, the instant invention includes a computer system, having at least the following components: a) memory having at least one region for storing computer executable program code; and b) at least one processor for executing the computer executable program code stored in the memory, where the computer executable program code includes: code to provide at least one benefit to at least one subscriber of at least one subscription entity, where the at least one benefit includes uncovered information about at least one of unclaimed asset, available asset, claim, and entitlement for the at least one subscriber and where the uncovered information is obtained, at least in part, by employing: code to store, in at least one subscriber database, at least one record containing personal data of the at least one subscriber; code to search at least one repository database based, at least in part, on at least a portion of the stored personal data of the at least one subscriber, to uncover for the at least one subscriber at least one of: i) unclaimed asset, ii) available asset, iii) claim, and iv) entitlement; where the at least one repository database includes information about at least one of unclaimed asset, available asset, claim, and entitlement for a plurality of person; code to receive the uncovered information for the at least one subscriber; and code to alert the at least one subscriber to the uncovered information.

In some embodiments, the at least one processor of the system of the instant invention further execute code to parse the information about at least one of unclaimed asset, available asset, claim, and entitlement for the plurality of person from the at least one repository database to match the parsed information to the at least a portion of the stored personal data of the at least one subscriber.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further still, the various steps may be carried out in any desired order (and any desired steps may be added and/or any desired steps may be eliminated).

What is claimed is:

1. A computer-implemented method, comprising:
electronically receiving, utilizing at least one particular graphical user interface, by at least one specifically programmed processing engine server, a first electronic message having at least one first piece of personal identifying data for each subscriber of a plurality of subscribers of at least one subscription entity;
wherein the at least one subscription entity and each of the plurality of subscribers have entered into an arrangement by which the at least one subscription entity offers at least one subscription to each of the plurality of subscribers during a time period;

wherein the at least one particular graphical user interface is configured to provide the at least one subscription by the at least one subscription entity;

receiving, utilizing the at least one particular graphical user interface, by the at least one specifically programmed processing engine server, a second electronic message having a consent expressed by each subscriber of the plurality of subscribers to:
  i) electronically obtain at least one second piece of personal identifying data about each subscriber, by electronically accessing at least one electronic source which is independent from such subscriber, and
  ii) electronically execute at least one electronic search query subroutine in at least one electronic repository database on behalf of such subscriber for uncovered information, wherein the uncovered information comprises information previously unknown by such subscriber about at least one of the following:
    1) at least one unknown asset of such subscriber,
    2) at least one unknown claim available to be claimed by such subscriber, or
    3) at least one unknown entitlement available to such subscriber;

based on the second electronic message having the consent, electronically accessing and obtaining, from the at least one electronic source, being independent from such subscriber, by the at least one specifically programmed processing engine server, the at least one second piece of personal identifying data for such subscriber of the plurality of subscribers of the at least one subscription entity, by electronically executing the at least one first electronic search query subroutine;

for each of the plurality of subscribers, after: (1) the receiving the at least one first piece of personal identifying data of such subscriber, (2) the obtaining the at least one second piece of personal identifying data of such subscriber and (3) the obtaining the consent expressed by such subscriber to conduct a search on behalf of such subscriber for uncovered information, electronically accessing, in real-time, by the at least one specifically programmed processing engine server, the at least one electronic repository database related to the uncovered information and electronically executing, by the at least one specifically programmed processing engine server, at least one second electronic search query subroutine against the at least one electronic repository database, wherein the at least one second electronic search query subroutine is based, at least in part, on the at least one first piece of personal identifying data of such subscriber, the at least one second piece of personal identifying data of such subscriber, or both;

electronically receiving, by the at least one specifically programmed processing engine server, based on the electronically executing the at least one second electronic search query subroutine, at least one electronic search result data representative of the uncovered information associated with each matched subscriber whose the at least one first piece of personal identifying data, the at least one second piece of personal identifying data, or both, have matched, based on a pre-determined error deviation, at least one electronic data record in the at least one electronic repository database related to the uncovered information;

for each matched subscriber, automatically and electronically checking, by the at least one specifically programmed computer processing engine server, the at least one electronic search result for at least one close variation from the at least one first piece of personal identifying data of such matched subscriber or from the at least one second piece of personal identifying data of such matched subscriber, or both, based, at least in part, on:
  i) electronically executing at least one phonetic language technique subroutine, at least one semantic language technique subroutine, or both, and
  ii) at least one predetermined variation requirement;

for each matched subscriber, electronically confirming, based on the automatically and electronically checking the at least one electronic search result for the at least one close variation, by the at least one specifically programmed processing engine server, the uncovered information as being related to each respective matched subscriber of the at least one subscription entity;

based on the confirming the uncovered information as being related to each respective matched subscriber of the at least one subscription entity, electronically causing, by the at least one specifically programmed processing engine server, to electronically reconfigure the at least one particular graphical user interface to form at least one reconfigured particular graphical user interface;

electronically receiving, by the at least one processing engine server via the reconfigured particular graphical user interface, from each respective matched subscriber, at least one electronic request for at least one action regarding at least one of:
  1) at least one unknown asset of each respective matched subscriber,
  2) at least one unknown claim available to be claimed by each respective matched subscriber, or
  3) at least one unknown entitlement available to each respective matched subscriber; and instructing, by the at least one processing engine server, at least one intermediary subroutine to perform the at least one action in the received request without having each respective matched subscriber to contact a third party to take the at least one action regarding at least one of:
  1) the at least one unknown asset of each respective matched subscriber,
  2) the at least one unknown claim available to be claimed by each respective matched subscriber, or
  3) the at least one unknown entitlement available to each respective matched subscriber.

2. The method of claim 1, wherein the automatically and electronically checking further comprises:
  electronically parsing the at least one search result of the searching; and
  electronically matching the parsed information to the at least one first piece of personal identifying data of such matched subscriber, the at least one second piece of personal identifying data of such matched subscriber, or both.

3. The method of claim 2, wherein the at least one second piece of personal identifying data of such subscriber comprises address history of such subscriber.

4. The method of claim 1, wherein a subscriber retention of the at least one subscription entity is based, at least in part, on identifying the matched subscribers.

5. The method of claim 1, wherein subscriber enrollment of the at least one subscription entity is based, at least in part, on identifying the matched subscribers.

6. The method of claim 1, wherein the at least one subscription entity is a consumer credit report company or an identity monitoring company.

7. The method of claim 1, wherein the at least one repository database is unrelated to the at least one subscription entity.

8. A computer system, comprising:
at least one particular programmed processing engine server, having:
a non-transient memory having at least one region for storing particular computer executable program code; and
at least one processor for executing the particular program code stored in the memory, wherein, when the at least one processor executes the particular program code, the at least one particular programmed processing engine server is configured to at least perform the following operations:
receiving, utilizing at least one first particular graphical user interface, a first electronic message having at least one first piece of personal identifying data for each subscriber of a plurality of subscribers of at least one subscription entity;
wherein the at least one subscription entity and each of the plurality of subscribers have entered into an arrangement by which the at least one subscription entity offers at least one subscription to each of the plurality of subscribers during a time period;
wherein the at least one particular graphical user interface is configured to provide the at least one subscription by the at least one subscription entity;
receiving, utilizing the at least one particular graphical user interface, a second electronic message having a consent expressed by each subscriber of the plurality of subscribers to:
i) electronically obtain at least one second piece of personal identifying data about each subscriber, by electronically accessing at least one electronic source which is independent from such subscriber, and
ii) electronically execute at least one electronic search query subroutine in at least one electronic repository database on behalf of such subscriber for uncovered information, wherein the uncovered information comprises information previously unknown by such subscriber about at least one of the following:
1) at least one unknown asset of such subscriber,
2) at least one unknown claim available to be claimed by such subscriber, or
3) at least one unknown entitlement available to such subscriber;
based on the second electronic message having the consent, obtaining, from the at least one electronic source being independent from such subscriber, the at least one second piece of personal identifying data for such subscriber of the plurality of subscribers of the at least one subscription entity, by electronically executing the at least one first electronic search query subroutine;
for each of the plurality of subscribers, after: (1) the receiving the at least one first piece of personal identifying data of such subscriber, (2) the obtaining the at least one second piece of personal identifying data of such subscriber and (3) the obtaining the consent expressed by such subscriber to conduct a search on behalf of such subscriber for uncovered information, electronically accessing, in real-time, the at least one electronic repository database related to the uncovered information and electronically executing, by the at least one specifically programmed processing engine server, at least one second electronic search query subroutine against the at least one electronic repository database, wherein the at least one second electronic search query subroutine is based, at least in part, on the at least one first piece of personal identifying data of such subscriber, the at least one second piece of personal identifying data of such subscriber, or both;
electronically receiving, based on the electronically executing the at least one second electronic search query subroutine, at least one electronic search result data representative of the uncovered information associated with each matched subscriber whose the at least one first piece of personal identifying data, the at least one second piece of personal identifying data, or both, have matched, based on a pre-determined error deviation, at least one electronic data record in the at least one electronic repository database related to the uncovered information;
for each matched subscriber, automatically and electronically checking the at least one electronic search result for at least one close variation from the at least one first piece of personal identifying data of such matched subscriber or from the at least one second piece of personal identifying data of such matched subscriber, or both, based, at least in part, on:
i) electronically executing at least one phonetic language technique subroutine, at least one semantic language technique subroutine, or both, and
ii) at least one predetermined variation requirement;
for each matched subscriber, electronically confirming, based on the automatically and electronically checking the at least one electronic search result for the at least one close variation, the uncovered information as being related to each respective matched subscriber of the at least one subscription entity;
based on the confirming the uncovered information as being related to each respective matched subscriber of the at least one subscription entity, electronically causing to electronically reconfigure the at least one particular graphical user interface to form at least one reconfigured particular graphical user interface;
electronically receiving, via the reconfigured particular graphical user interface, from each respective matched subscriber, at least one electronic request for at least one action regarding at least one of:
1) at least one unknown asset of each respective matched subscriber,
2) at least one unknown claim available to be claimed by each respective matched subscriber, or
3) at least one unknown entitlement available to each respective matched subscriber; and
instructing at least one intermediary subroutine to perform the at least one action in the received request without having each respective matched subscriber to contact a third party to take the at least one action regarding at least one of:
1) the at least one unknown asset of each respective matched subscriber,
2) the at least one unknown claim available to be claimed by each respective matched subscriber, or
3) the at least one unknown entitlement available to each respective matched subscriber.

9. The system of claim 8, wherein the at least one subscription entity is a consumer credit report company or an identity monitoring company.

10. The system of claim 8, wherein the automatically and electronically checking further comprises:
- electronically parsing the at least one search result of the searching; and
- electronically matching the parsed information to the at least one first piece of personal identifying data of such matched subscriber, the at least one second piece of personal identifying data of such matched subscriber, or both.

11. The system of claim 8, wherein the at least one second piece of personal identifying data of such subscriber comprises address history of such subscriber.

12. The system of claim 8, wherein subscriber retention of the at least one subscription entity is based, at least in part, on identifying the matched subscribers.

13. The system of claim 8, wherein subscriber enrollment of the at least one subscription entity is based, at least in part, on identifying the matched subscribers.

14. The system of claim 8, wherein the at least one repository database is unrelated to the at least one subscription entity.

\* \* \* \* \*